Patented Nov. 1, 1938

2,134,769

UNITED STATES PATENT OFFICE 2,134,769

WATER RESISTANT ZEIN COMPOSITION

Collins Veatch, La Grange, Ill., assignor, by mesne assignments, to Corn Products Refining Company, New York, N. Y., a corporation of New Jersey No Drawing. Application July 9, 1937, Serial No. 152,779

2 Claims. (Cl. 134—12)

This invention relates to the treatment of zein to render it more resistant to water, in the production, for example, of coatings or films; and the invention is based on the discovery that if a relatively small amount of a wax is intimately mixed, in solution with a suitable solvent for the wax, with a solution of zein, the film or other body which results from the evaporation of the solvents will have a water resistance very much greater than the water resistance of a film composed of zein alone. The increase in the water resistance, due to the incorporation of the wax, is probably at least 6 to 10 times the water resistance of a film containing zein alone.

Any wax may be used such as paraffine, beeswax, and spermaceti.

As the wax solvent hydrocarbons, such as benzol and toluol, or a mixture of benzol and toluol may be used.

The solvent for the zein should have a boiling point lower than the wax solvent. Suitable zein solvents are aqueous ethyl alcohol and aqueous methyl alcohol. The water content of the aqueous alcohol solvent should be high enough to keep the zein in solution. If too high the water will be retained on the film and affect its transparency. The water content may vary from 6% to 10%. For methyl alcohol the water content should be lower than for ethyl alcohol. Preferably the methyl alcohol has a water content of 6% and the ethyl alcohol a water content of 8%.

If methyl alcohol is used as a zein solvent, the preferred wax solvent is benzol. If ethyl alcohol is used as the zein solvent, the preferred wax solvent is toluol or a mixture of benzol and of toluol. The mixture is preferable because the zein will gel less readily than where toluol alone is used. The purpose of using a percentage of toluol with the benzol, in case ethyl alcohol is the zein solvent, is to make certain that a portion of the wax solvent will remain in the film until after the alcohol has been evaporated and thus insure bringing the wax to the surface of the film.

Preferably in making the solvent mixture the alcohol, wax and wax solvent are warmed together so as to thoroughly melt the wax, after which the zein is stirred in and dissolved in the alcohol.

This is not absolutely essential since the final mixture may be warmed and thoroughly stirred if the wax shows any tendency to separate on standing or cooling.

The following are specific examples illustrating the invention. They are not to be taken as limiting the invention to the particular ingredients and proportions given. The intention is to cover all equivalents of the substances specified (except the zein) and all modifications of the process and product within the scope of the appended claims.

Example 1

| | |
|---|---|
| Zein | 100 parts by weight |
| Paraffine | 4 parts by weight |
| Methyl alcohol (94%) | 270 parts by volume |
| Benzol | 130 parts by volume |

Or reduced to a weight basis the formula will be: Zein 100 parts; paraffine 4 parts; methyl alcohol (94%) 218.2 parts; benzol 116 parts.

The solvent mixture formed by mixing these substances together may be applied with a brush, roller or other means and will dry readily without application of heat. Such solvent mixture is particularly suitable for coating paper, fiber board or other fibrous material or fiber containing material in order to make it water-resistant.

Example 2

The solvent mixture consists of the following substances:

| | |
|---|---|
| Zein | 100 parts by weight |
| Paraffine | 4 parts by weight |
| Ethyl alcohol (92%) | 270 parts by volume |
| Benzol | 70 parts by volume |
| Toluol | 60 parts by volume |

On a weight basis this would be: Zein 100 parts; paraffine 4 parts; ethyl alcohol (92%) 217.5 parts; benzol 62.5 parts; toluol 52 parts.

The ingredients are mixed and the resultant solvent mixture used as indicated for Example 1.

The wax content can be varied considerably, say from 1% to 6%.

I claim:

1. A solution mixture containing the following substances in proportions as follows: zein 100 parts by weight, paraffine 4 parts by weight, 94% methyl alcohol 270 parts by volume, benzol 130 parts by volume.

2. A solution mixture containing the following substances in proportions substantially as follows: zein 100 past by weight; paraffine 4 parts by weight; 92% ethyl alcohol 270 parts by volume; benzol 70 parts by volume; and toluol 60 parts by volume.

COLLINS VEATCH.